(12) United States Patent
Muraki et al.

(10) Patent No.: US 8,102,627 B2
(45) Date of Patent: Jan. 24, 2012

(54) SLIDER SUSPENSION ASSEMBLY HAVING LIMITER TAB PASSING THROUGH LOAD BEAM HOLE BOTH WITHIN SLIDER SILHOUETTE

(75) Inventors: Takuma Muraki, Kanagawa (JP);
Kiroyasu Tsuchida, Kanagawa (JP);
Kazuyoshi Yoshida, Kanagawa (JP);
Takahisa Okada, Kanagawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 834 days.

(21) Appl. No.: 11/732,605

(22) Filed: Apr. 3, 2007

(65) Prior Publication Data

US 2007/0230058 A1  Oct. 4, 2007

(30) Foreign Application Priority Data

Apr. 3, 2006  (JP) .................. 2006-102125

(51) Int. Cl.
*G11B 21/16* (2006.01)
*G11B 5/48* (2006.01)

(52) U.S. Cl. .................................. 360/245.7
(58) Field of Classification Search ............... 360/245.7
See application file for complete search history.

(56) References Cited

U.S. PATENT DOCUMENTS

| 5,892,637 | A | | 4/1999 | Brooks, Jr. et al. | |
|---|---|---|---|---|---|
| 6,057,985 | A | * | 5/2000 | Kazama ..................... | 360/245.4 |
| 6,067,209 | A | * | 5/2000 | Aoyagi et al. .............. | 360/245.7 |
| 6,172,853 | B1 | * | 1/2001 | Davis et al. ................ | 360/245.7 |
| 6,233,121 | B1 | * | 5/2001 | Pan ............................ | 360/245.7 |
| 6,243,235 | B1 | * | 6/2001 | Fu et al. ..................... | 360/245.7 |
| 6,320,729 | B1 | * | 11/2001 | Coon ......................... | 360/245.7 |
| 6,417,996 | B1 | * | 7/2002 | Budde ........................ | 360/245.7 |
| 6,611,402 | B1 | * | 8/2003 | Mangold .................... | 360/245.7 |
| 6,980,400 | B2 | * | 12/2005 | Girard ........................ | 360/245.7 |
| 6,995,953 | B2 | | 2/2006 | Mahoney et al. | |
| 7,298,590 | B1 | * | 11/2007 | Mei ............................ | 360/245.7 |
| 2002/0075602 | A1 | * | 6/2002 | Mangold et al. ........... | 360/245.7 |
| 2003/0026038 | A1 | * | 2/2003 | Zeng et al. ................. | 360/97.01 |
| 2004/0032695 | A1 | * | 2/2004 | Sassine et al. ............. | 360/245.7 |
| 2005/0180052 | A1 | * | 8/2005 | Suzuki et al. .............. | 360/245.7 |
| 2006/0092571 | A1 | * | 5/2006 | Kang ......................... | 360/245.7 |

FOREIGN PATENT DOCUMENTS

| JP | 11-514780 | 12/1999 |
|---|---|---|
| JP | 2004-134059 | 4/2004 |

* cited by examiner

*Primary Examiner* — Craig A. Renner
(74) *Attorney, Agent, or Firm* — Mahamedi Paradice Kreisman LLP; Christopher J. Brokaw (57) ABSTRACT

Embodiments in accordance with the present invention provide a limiter mechanism that permits the gimbal to be designed more freely than before. The head gimbal assembly (HGA) according to one embodiment of the present invention has a limiter mechanism within the silhouette of the head slider. The limiter mechanism has a limiter tab formed in the gimbal tongue and projection of the load beam. Upon receipt of an external impact, the projection locks the limiter tab, thereby limiting the deformation of the gimbal. The limiter tab is formed by fabricating a part within the silhouette of the head slider. This structure allows for freer design of the gimbal and the load beam.

11 Claims, 7 Drawing Sheets

SLIDER SUSPENSION ASSEMBLY HAVING LIMITER TAB PASSING THROUGH LOAD BEAM HOLE BOTH WITHIN SLIDER SILHOUETTE

CROSS-REFERENCE TO RELATED APPLICATION

The instant nonprovisional patent application claims priority to Japanese Application No. 2006-102125, filed Apr. 3, 2006 and incorporated by reference in its entirety herein for all purposes.

BACKGROUND OF THE INVENTION

Known disk drive units include those which use a variety of recording disks such as optical disk, magneto-optical disk, and flexible magnetic disk. The most popular among them is the hard disk drive (HDD) which is widely used as the indispensable memory unit for present-day computer systems. Because of its outstanding characteristics, the HDD is finding new uses as removable memory in many areas other than computers, such as animation recording and playback, car navigation systems, mobile phones, and digital cameras.

The magnetic disk used for the HDD has many concentric data tracks, each having data sectors containing servo data (for address information) and user data. The data sector is accessed by the head element according to the address information contained in the servo data, so that it permits data writing and reading.

The head element is mounted on the slider which is fixed to the suspension of the actuator. The assembly consisting of the actuator and the head slider is called the head stack assembly (HSA). Also, the assembly consisting of the suspension and the head slider is called the head gimbal assembly (HGA).

The head slider floats above the magnetic disk with a certain gap between them owing to a balance between two forces, one generated by the viscosity of air between the rotating magnetic disk and the air bearing surface (ABS) of the slider facing the magnetic disk, and the other toward the magnetic disk generated by the suspension. The suspension has the gimbal, which holds the head slider opposite to the magnetic disk, and the load beam which holds the gimbal opposite to the magnetic disk. The gimbal is capable of deformation so that the slider can sway in prescribed directions to follow the vibration of the magnetic disk.

The suspension is also provided with a limiter mechanism which limits the gap between the gimbal and the load beam so that the gimbal will not deform excessively. An example of the limiter mechanism is disclosed in Japanese Laid-Open Patent No. 2004-134059.

As mentioned above, the suspension should be provided with the limiter mechanism to limit the deformation of the gimbal for its effective function. On the other hand, more difficulties than before are involved in the design of the gimbal as the recording density of the magnetic disk increases and the floating height of the head decreases. It is necessary for the gimbal to follow the lengthwise and lateral movements of the head slider so that the head slider can move smoothly.

On the other hand, the gimbal also needs strength. It should be strong enough to move the head slider away from the magnetic disk in the case of HDD of load-unload type. For the gimbal to have an adequately designed shape, the parts around the head slider should be designed more freely than before.

BRIEF SUMMARY OF THE INVENTION

Embodiments in accordance with the present invention provide a limiter mechanism that permits the gimbal to be designed more freely than before. In accordance with the particular embodiment shown in FIG. 3, the HGA has a limiter mechanism within the silhouette of the head slider 105. The limiter mechanism has the limiter tab 225 formed in the gimbal tongue and the projection 233 of the load beam 203. Upon receipt of an external impact, the projection 233 locks the limiter tab 225, thereby limiting the deformation of the gimbal 202. The limiter tab 225 is formed by fabricating a part within the silhouette of the head slider 105. This structure allows for freer design of the gimbal 202 and the load beam 203.

DETAILED DESCRIPTION OF THE INVENTION

Embodiments in accordance with the present invention relate to a disk drive unit and an assembly used for it. More particularly, embodiments of the present invention relate to a suspension having a limiter mechanism to limit its deformation and a disk drive unit provided with the suspension.

One embodiment of the present invention covers an assembly having a slider and a supporting suspension. The suspension has a gimbal and a load beam, the gimbal having a tongue to which the slider is fixed and a limiter tab which limits the displacement of the tongue and the load beam having a locking part which supports the gimbal on its first surface and locks the limiter tab, the limiter tab and the locking part being within the region overlapping the slider in the direction perpendicular to the first surface, and the limiter tab is formed by fabricating part of the gimbal within the region overlapping the slider in the direction perpendicular to the first surface. The above-mentioned structure of the limiter tab and locking part permits the gimbal around the slider to be designed more freely than before.

The limiter tab can extend from the front end or the rear end of the tongue. Moreover, it can have a lengthwise dimension (projected onto the first surface) which is smaller than one half the lengthwise dimension (projected onto the first surface) of the slider. This structure permits the slider to be firmly fixed to the gimbal.

The load beam can have a pad that comes into contact with the tongue at the rear of the slider, and the limiter tab should preferably extend from the front of the tongue. The tongue can connect with the main body of the gimbal at its rear side, and the limiter tab should preferably extend from the front of the tongue. The load beam can have a pad that comes into contact with the tongue at the rear of the slider, the tongue may connect with the main body of the gimbal at its rear, and the limiter tab may extend from the front of the tongue. This structure permits the slider to move freely and surely limits the deformation of the gimbal.

The load beam may have a pad that comes into contact with the tongue at the front of the slider, and the limiter tab should preferably extend from the rear of the tongue. Alternatively, the tongue may connect with the main body of the gimbal at its front, and the limiter tab may extend from the rear of the tongue. The load beam may have a pad that comes into contact with the tongue at the front of the slider, the tongue may connect with the main body of the gimbal at its front, and the limiter tab may extend from the rear of the tongue. This structure permits the slider to move freely and surely limits the deformation of the gimbal.

The limiter tab may extend from the front end or the rear end of the tongue and passes through the hole of the load beam, and the locking part may engage with the limiter tab at the opposite side of the first surface. In this way the limiter mechanism to limit the deformation of the gimbal can be constructed within a small area.

Another embodiment of the present invention covers a disk drive unit which has a motor that rotates a disk, a slider that floats above the disk, a suspension that supports the slider, and an actuator that turns around a rotational axis to move the slider. The suspension has a gimbal and a load beam, the gimbal having a tongue to which the slider is fixed and a limiter tab which limits the displacement of the tongue and the load beam having a locking part which supports the gimbal on its surface facing the disk and locks the limiter tab. The limiter tab and the locking part are within the region overlapping the slider in the direction perpendicular to the recording surface of the disk, and the limiter tab is formed by fabricating part of the gimbal within the region overlapping the slider in the direction perpendicular to the recording surface of the disk. The limiter tab and the locking part constructed as mentioned above, permit the gimbal around the slider to be designed more freely than before.

Embodiments in accordance with the present invention offer the advantage of effectively limiting the deformation of the gimbal and permitting the suspension to be designed more freely than before.

The following describes the embodiment of the present invention with reference to the accompanying drawings in which identical elements are designated by their respective identical names without unnecessary duplication for the sake of brevity.

The disk drive unit according to an embodiment of the present invention is embodied in the hard disk drive (HDD) as described in the following. The HDD is characterized by having a limiter mechanism in the silhouette of the head slider. The limiter mechanism has a limiter tab as one of its constituents in the gimbal tongue, and the limiter tab is formed from a part in the silhouette of the head slider. This structure allows for freer design for the gimbal and load beam around the head slider.

Figure 1:
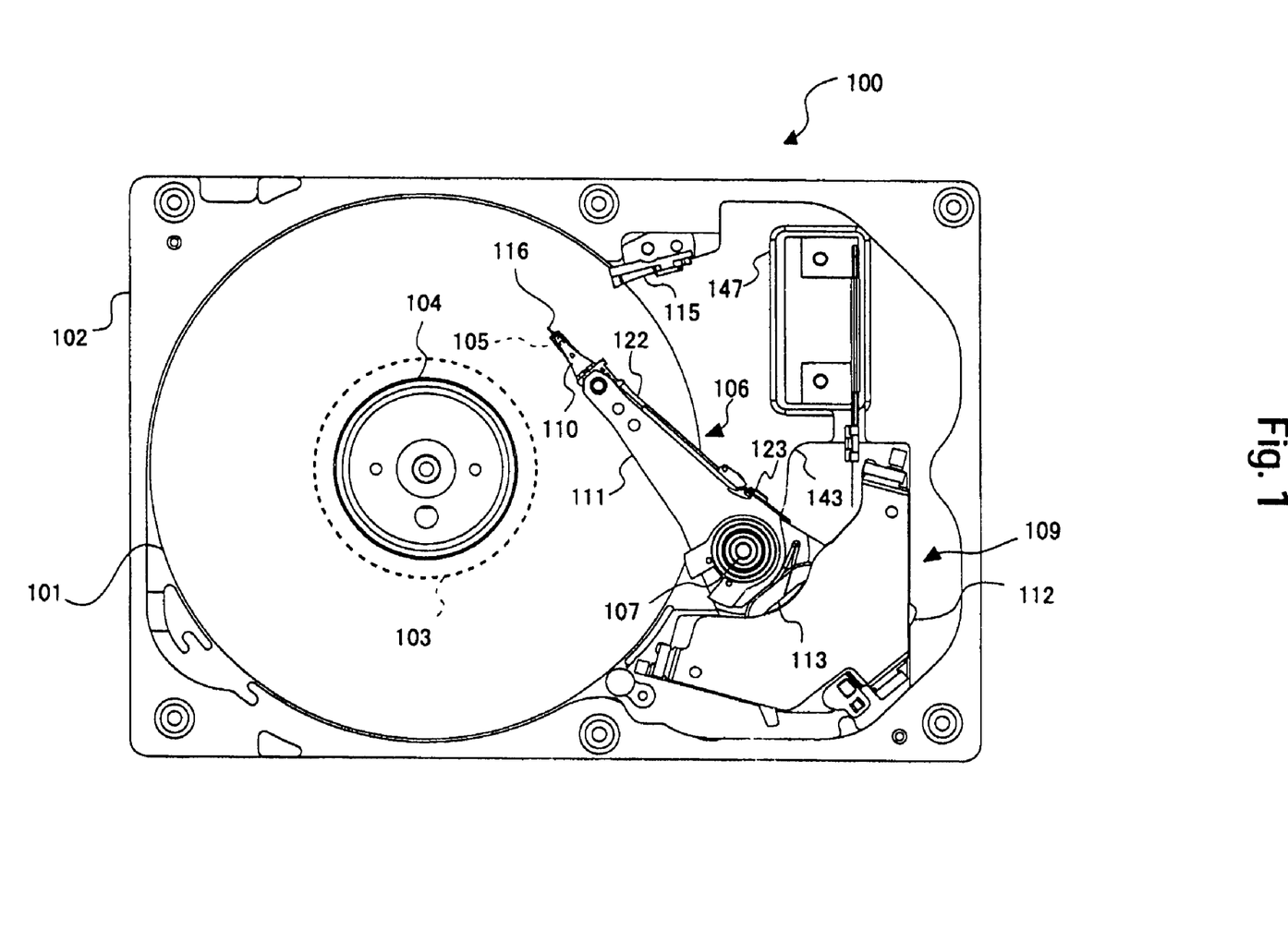
FIG. 1 is a schematic plan view showing the entire structure of the hard disk drive according to one embodiment of the present invention.

The overall structure of the HDD will be described first before a detailed description is given of the features of the embodiment. The HDD 100 is constructed as shown in FIG. 1 which is a schematic top plan view. It has the magnetic disk 101 for non-volatile data recording to be made by magnetization of a magnetic layer thereon. It is mounted on the base 102 which constitutes a disk enclosure together with a cover (not shown) that closes the upper opening, with a gasket (not shown) interposed between the base and the cover. The disk enclosure holds therein the constituents of the HDD 100.

The magnetic disk 101 is fixed to the spindle motor 103 by the hub 104, so that it is turned at a prescribed angular speed by the spindle motor 103 fixed to the base 102. It allows for access by the head slider 105, which consists of a head element and a slider fixedly joined together. The head slider 105 is held and moved by the actuator 106.

The actuator 106 is rotatably held by the rotating shaft 107. It has the voice coil motor (VCM) 109 for its rotation. It also has the head slider 105 at its tip, the suspension 110, the arm 111, and the coil support 112 holding the flat coil 113, which are joined sequentially in the order mentioned. It is regarded as consisting of a rear portion (close to the rotating shaft 107) and a front portion (close to the tip) in the following description thereof. The term "head-gimbal assembly (HGA)" as used in this specification denotes the assembly consisting of the head slider 105 and the suspension 110. A detailed description will be given later of the suspension 110 supporting the head slider 105.

The actuator 106 unloads (retracts) the head slider 105 to a safety place from the magnetic disk 101 which is coming to a stop. It also loads the head slider from a safety place onto the magnetic disk 101. Loading and unloading are facilitated by the ramp 115 (provided with a safety place) near the outer edge of the magnetic disk 101. The suspension 110 has the tab 116 attached to the forward end thereof. It slides on the ramp 115 when it is loaded and unloaded. Incidentally, the mechanism just mentioned above may be replaced by the "Contact Start and Stop" system, in which the head slider 105 is positioned on the inner circumference of the magnetic disk 101 when data writing or data reading is not performed. This system may also be applied to the HDD according to an embodiment of the present invention.

For data writing/reading to/from the magnetic disk 101, the actuator 106 moves the head slider 105 to the data area on the surface of the magnetic disk 101 which is rotating. Rotation of the actuator 106 causes the head slider 105 to move in the radial direction of the recording surface of the magnetic disk 101. During its movement, the head slider 105 floats above the magnetic disk at a certain height which is determined by the balance between a downward force applied by the suspension 110 and an upward force that occurs at the air bearing surface (ABS) of the head slider 105 facing the magnetic disk 101.

The head slider 105 communicates with the preamp IC 123 for signal exchange through the trace 122 fixed to the actuator 106. The trace 122 extends on the arm 111 along its side which faces the magnetic disk 101 and the rotating direction of the arm 111. The preamp IC 123 communicates with the control circuit (not shown, mounted on the back of the base 102) for signal exchange through the FPC 143 and the connector 147. The control circuit controls the action of the HDD 100 and performs signal processing. Incidentally, the HDD 100 may have one or more magnetic disks 101, each capable of recording on one side or both sides thereof. The HDD 100 has one set of HGA for each recording surface.

Figure 2A:
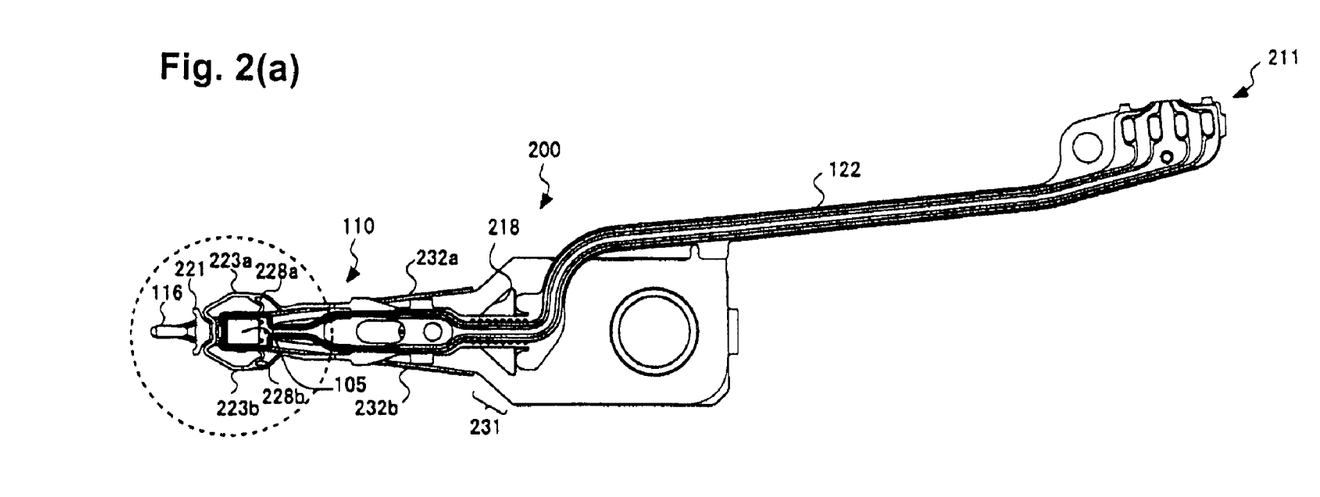
FIGS. 2(a)-2(b) are plan views showing the entire structure of the head-gimbal assembly according to one embodiment of the present invention
Figure 2B:
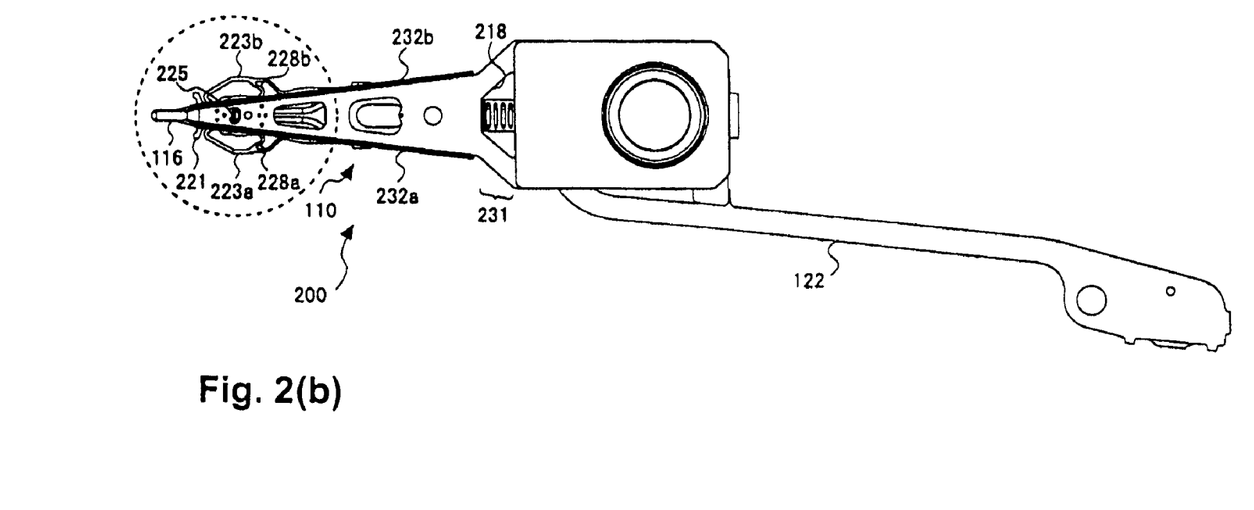
Figure 3:
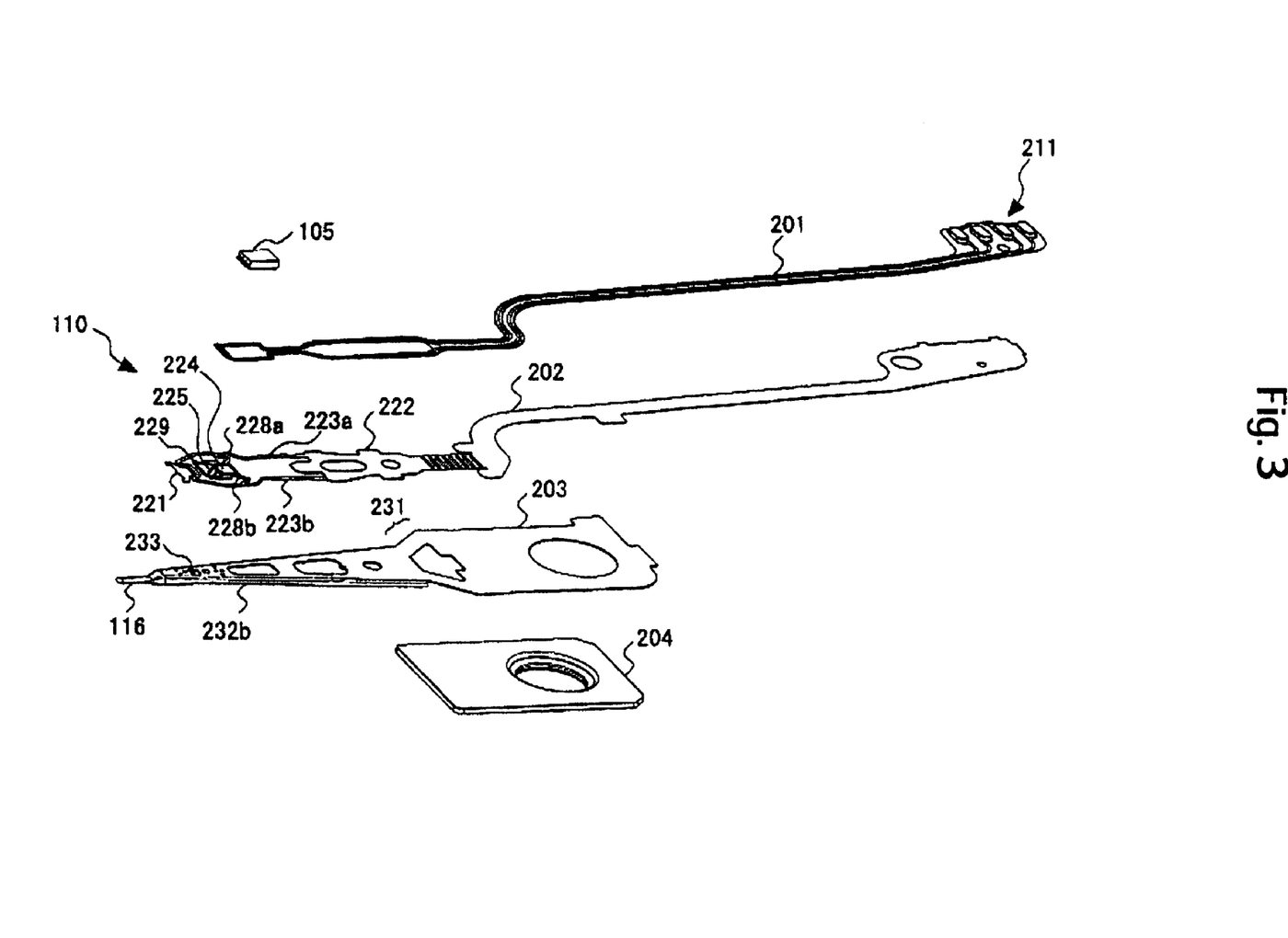
FIG. 3 is an exploded perspective view showing the entire structure of the head-gimbal assembly according to one embodiment of the present invention.

FIGS. 2(a) and 2(b) are schematic plan views showing the structure of the HGA 200 according to one embodiment of the present invention. FIG. 2(a) shows the structure of the HGA 200 as viewed from the magnetic disk 101 (or toward the head slider 105). FIG. 2(b) shows the structure of the HGA 200 as viewed from the opposite side. FIG. 3 is an exploded perspective view showing the constituents of the HGA 200. These figures will be referenced in the following description.

As shown in FIG. 3, the suspension 110 (according to one embodiment of the present invention) has the flexible cable 201, the gimbal 202, the load beam 203, and the mount plate 204 as major constituents. The flexible cable 201 and part of the gimbal 202 thereunder constitute the trace 122. Incidentally, the flexible cable 201 consists of several lead wires with integrally formed polyimide insulating layers.

The lead wires terminate with the multi-connector 211 (connected to the FPC 143) at one end and with the pad (formed on the head slider 105) at the other end. The flexible cable 201 is fixed to the gimbal 202 with an adhesive. Alternatively, it may be formed directly on the gimbal 202.

The load beam 203 is a precision leaf spring formed from stainless steel. It is thin and light and has sufficient rigidity greater than that of the gimbal 202. As shown in FIGS. 2(a) and 2(b), it extends from the rotating axis (rear) to the tab 116 (front), with its side edges (beyond the hinge 231) bent downward (or toward the magnetic disk 101) to form the flanges 232a and 232b. These flanges enhance the rigidity of the load beam 203. The hinge 231 has the opening 218 but does not have the flanges 232a and 232b. It applies a downward spring force to the head slider 105 to balance against an upward force generated by the head slider 105 above the ABS surface.

The mount plate 204 and the gimbal 202, which are formed from stainless steel, are integrally attached to the load beam 203 by laser spot welding or staking. The gimbal 202 has the gimbal tab 221 at its forward end, which protects the gimbal 202 from unrecoverable deformation that would occur as the result of contact with the ramp 115 by external impact when the head slider 105 retreats to the ramp 115.

The gimbal 202 is fixed to the load beam 203 at the gimbal base 222 such that its forward part (including the gimbal arms 223a and 223b and the gimbal tongue 224) remains free. The gimbal base 222 has the gimbal arms 223a and 223b extending toward the head slider 105, so that they elastically support the gimbal tongue 224 formed at its forward end. The gimbal tongue 224 is joined to the gimbal arms 223a and 223b by the link arms 228a and 228b extending in the direction of rotary movement. The gimbal tongue 224 has at its forward side the rectangular ring 229 to support part of the flexible cable 201.

As shown in FIG. 2(a), the head slider 105 is fixed to that side of the gimbal tongue 224 which faces the magnetic disk. The gimbal tongue 224 has the limiter tab 225 to limit the movement of the gimbal. The limiter tab 225 (shown in FIG. 3) engages with the projection 233 of the load beam 203, so that the gimbal 202 is protected from large deformation. The limiter tab 225a nd the projection 233 constitute the limiter mechanism.

The suspension 110 may be subject to impact of varied degree during assembling or transportation. For the head slider 105 to keep a certain distance away from the rotating magnetic disk 101 at the time of unloading, there must be a force to pull away against the attracting force. The movement of the head slider 105 is regulated against the attracting force by the magnetic disk 101 or against external impact or impact from the limiter tab 225. In this way, the head slider 105 or the suspension 110 is effectively protected from damage. A detailed description of the limiter mechanism will be given later.

Figure 4A:
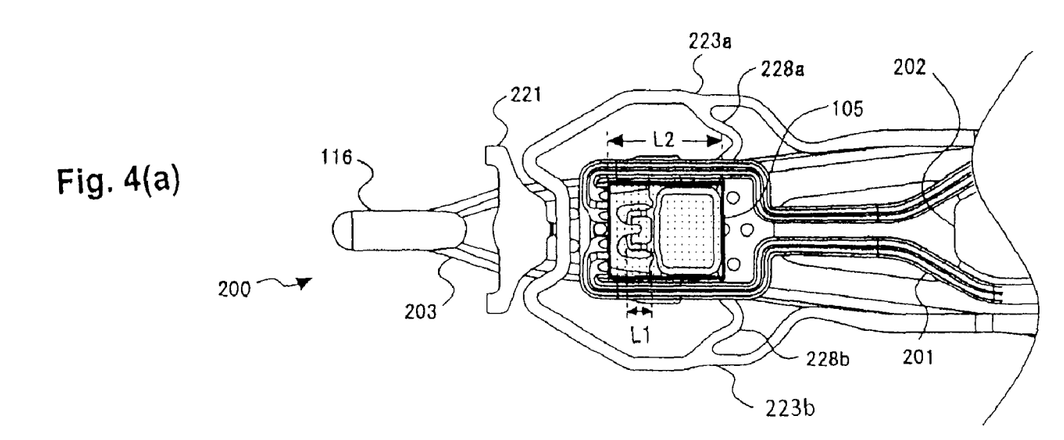
FIGS. 4(a)-(b) are schematic diagrams showing the structure of the forward end of the head-gimbal assembly (as viewed from the head slider side) according to one embodiment of the present invention.
Figure 4B:
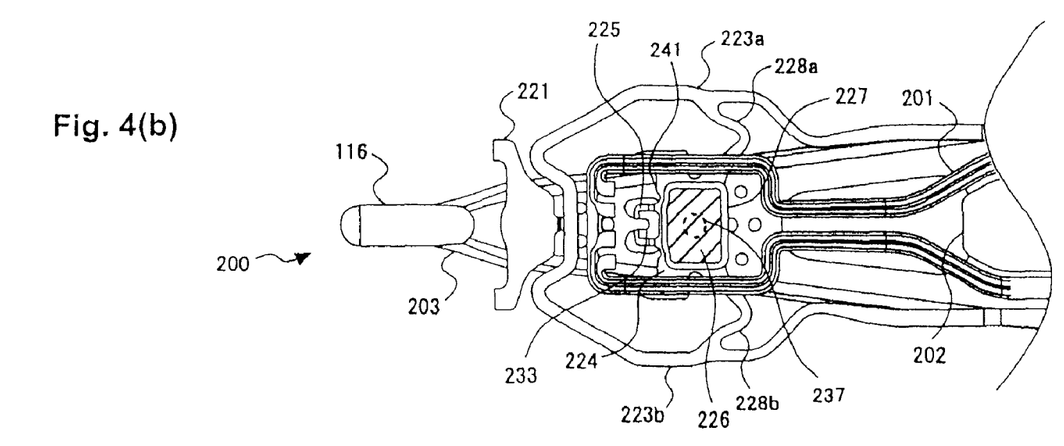

FIG. 4(a) is a partly enlarged schematic diagram showing the forward end of the HGA 200 which is encircled with a broken line in FIG. 2(a), as viewed toward the head slider 105. FIG. 4(b) is the same schematic diagram as FIG. 4(a), with the head slider 105 removed. The HGA 200 according to this embodiment is characterized in that the limiter mechanism (which consists of the limiter tab 225a nd the projection 133) is within the silhouette of the head slider 105. In other words, the limiter tab 225a nd the projection 233 are positioned within the area under the head slider 105 in the direction perpendicular to the recording surface of the magnetic disk 101 or to that side of the load beam 203 facing the magnetic disk.

The limiter tab 225 is formed by fabricating a portion of the gimbal 202 which is within the silhouette of the head slider 105. To be concrete, the limiter tab 225 is formed from a portion of the gimbal 202 by etching and press bending. The thus formed limiter tab 225 is within the silhouette of the head slider 105 attached to the gimbal tongue 224.

The fact that the limiter tab 225a nd the projection 233 are within the silhouette of the head slider 105 allows for the freer design of the gimbal 202 and the load beam 203. Moreover, the fact that the limiter tab 225 is fabricated from the portion within the silhouette of the head slider 105 allows for the freer design of the gimbal 202.

The head slider 105 is fixed to the gimbal tongue 224 with the adhesive 226 (such as low-elastic epoxy resin). Forming the limiter tab 225 within the silhouette of the head slider 105 limits the area by which the head slider 105 is fixed to the gimbal tongue 224. The limited fixing area causes the adhesive 226 to leak over the gimbal tongue 224 during the fabricating process.

To prevent the adhesive 226 from leakage, the HGA 200 is provided with the stud 227 on the gimbal tongue 224 and the adhesive 226 is applied to the region surrounded by the stud 227 resembling a ridge. In other words, the stud 227 functions as a wall to retain the adhesive 226 therein. The stud 227 may be formed from a cured resin. In addition, the stud 227 should preferably be so formed as to surround the region to which the adhesive is applied; however, it may have an opening at an adequate position.

The head slider 105 may not be able to be firmly fixed onto the surface of the gimbal tongue 224 if their adhesion area is excessively small when the limiter tab 225 is formed within the silhouette of the head slider 105. For a sufficient adhesion area, it is desirable that the limiter tab 225 within the silhouette should be smaller than a half of the head slider 105, as shown in FIG. 4.

According to this embodiment, the limiter tab 225 is provided at the forward end of the gimbal tongue 224 such that it extends from the forward end. To be concrete, the limiter tab 225 is formed at the front side 241 of the gimbal tongue 224 such that it extends forward. The dimension L1 of the limiter tab 225 should preferably be smaller than a half of the dimension L2 of the head slider 105. (L1 is a length of the limiter tab 225 projected onto the recording surface of the magnetic disk or onto that side of the load beam 203 facing the magnetic disk.) In this way the head slider is securely held on the gimbal tongue 224. This holds true also in the case where the limiter tab 225 extends from the rear end of the gimbal tongue 224.

Forming the limiter tab 225 within the silhouette of the head slider 105 needs an adequate position and shape to meet the requirement that the limiter tab 225 should be formed within a limited region and the limiter tab 225 should be strong enough to surely protect the gimbal 202 from deformation. Even though it is possible to form the limiter tab 225 on the lateral side of the head slider 105. In this case it is necessary to form the limiter tab 225 on both lateral sides of the head slider 105. Unfortunately, the lateral sides of the head slider 105 are smaller in area than the front and rear sides because of the structure of HGA 200. This makes it difficult to form the limiter tab capable of strong engagement.

By contrast, the limiter tab 225a ccording to this embodiment extends from the front side 241 of the gimbal tongue 224. The advantage of this structure is that the secure limiter mechanism can be formed within a smaller space than in the case where it is formed on the lateral side (in the rotating direction) of the gimbal tongue 224. The same effect as mentioned above will be produced even in the case where the limiter tab 225 extends from the rear end of the gimbal tongue 224, unlike the case shown in FIG. 4(a).

The gimbal tongue 224 is surrounded by and connected to the gimbal arms 223a and 223b. Its connection to the gimbal arms 223a and 223b is made by the link arms 228a and 228b at its rear side. In other words, the gimbal arms 223a and 223b support the gimbal tongue 224 by the link arms 228a and 228b from both sides (facing the rotating direction) at the rear of the gimbal tongue 224. In this case, it is desirable to form the limiter tab 225a t the front 241 of the gimbal tongue 224.

The front 241 of the gimbal tongue 224 is not supported by the gimbal arms 223a and 223b and hence it remains free and is subject to vibration. This drawback is eliminated by forming the limiter tab 225a t the front 241 of the gimbal tongue 224. The foregoing description is reversed in the case where the gimbal tongue 224 is connected to the gimbal arms 223a and 223b at its front. In other words, it is possible to effectively protect the gimbal tongue 224 and the gimbal 202 from excessive deformation by forming the limiter tab 225a t the rear of the gimbal tongue 224.

Figures 5A, 5B:
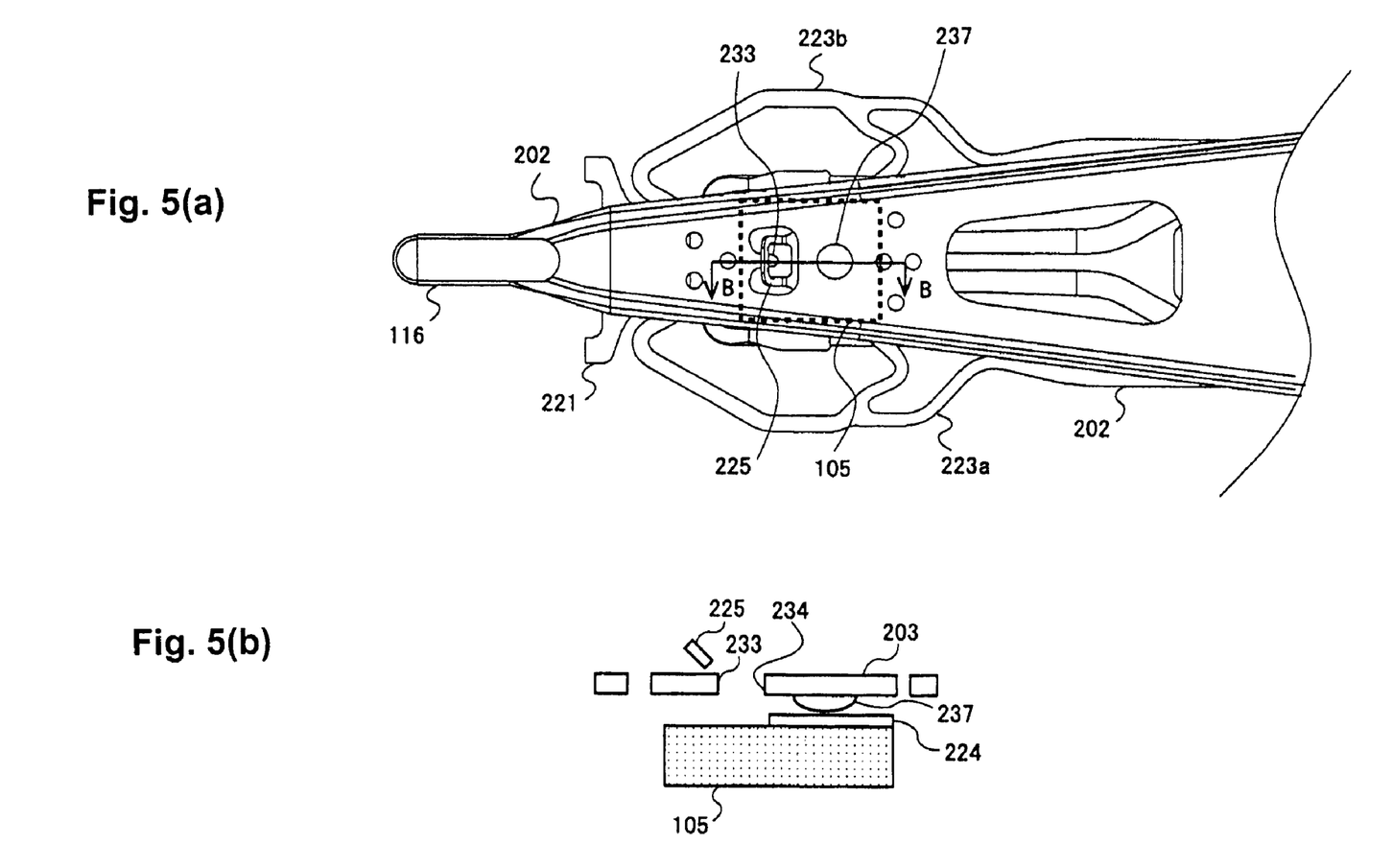
FIGS. 5(a)-(b) are schematic diagrams showing (in plan and section) the structure of the forward end of the head-gimbal assembly (as viewed from the head slider side) according to one embodiment of the present invention.

FIG. 5(a) is a partly enlarged schematic diagram showing the forward end of the HGA 200 which is encircled with a broken line in FIG. 2(b), as viewed toward the load beam 203 (from the opposite side of the head slider 105). FIG. 5(b) is an enlarged schematic sectional view taken along the line B-B in FIG. 5(a). It is to be noted in FIG. 5(b) that the pad 237 is formed on that surface of the load beam 203 which is opposite to the gimbal 202. The pad 237 rises toward the gimbal 202 (or the head slider 105).

The pad 237 pushes the gimbal tongue 224 (on the reverse side of the head slider 105). The curved gimbal arms 223 push the gimbal tongue 224 against the pad 237 by their elastic force. Thus, the gimbal tongue 224 deforms in its lengthwise or widthwise direction in response to the movement of the head slider 105, thereby absorbing the surface vibration of the magnetic disk 101 and the inclination of the assembly and also allowing for the accurate tracking of the magnetic disk 101.

As shown in FIG. 5(b), the pad 237 is in contact with the gimbal tongue 224 at a position shifted backward from the center of the head slider 105. In this case, the limiter tab 225 should preferably be formed at the front of the gimbal tongue 224. If the pad 237 is in contact with the gimbal tongue 224 at the rear of the head slider 105, the front of the head slider 105 tends to displace toward the magnetic disk 11. Therefore, the limiter tab 225 placed at the front of the gimbal tongue 224 effectively prevents the deformation of the gimbal tongue 224.

The HGA may be constructed such that the pad 237 comes into contact with the gimbal tongue 224 at the front of the head slider 105. In this case, the limiter tab 225 should preferably be formed at the front of the gimbal tongue 224, unlike the foregoing case.

A detailed description is given below of the structure of the limiter mechanism according to this embodiment. The load beam 203 has an opening 234 in the silhouette of the head slider 105. In the opening 234 is the projection 233, which projects toward the center of the opening 234 from the center of the front side of the opening 234. The projection 233 functions as a locking means. The limiter tab 225 gets into the opening 234 when the suspension 110 is assembled. In other words, the limiter tab 225 penetrates the opening 234 from that side of the load beam 203 which faces the gimbal 202 to its opposite back side, as shown in FIG. 5(b).

Figure 6:
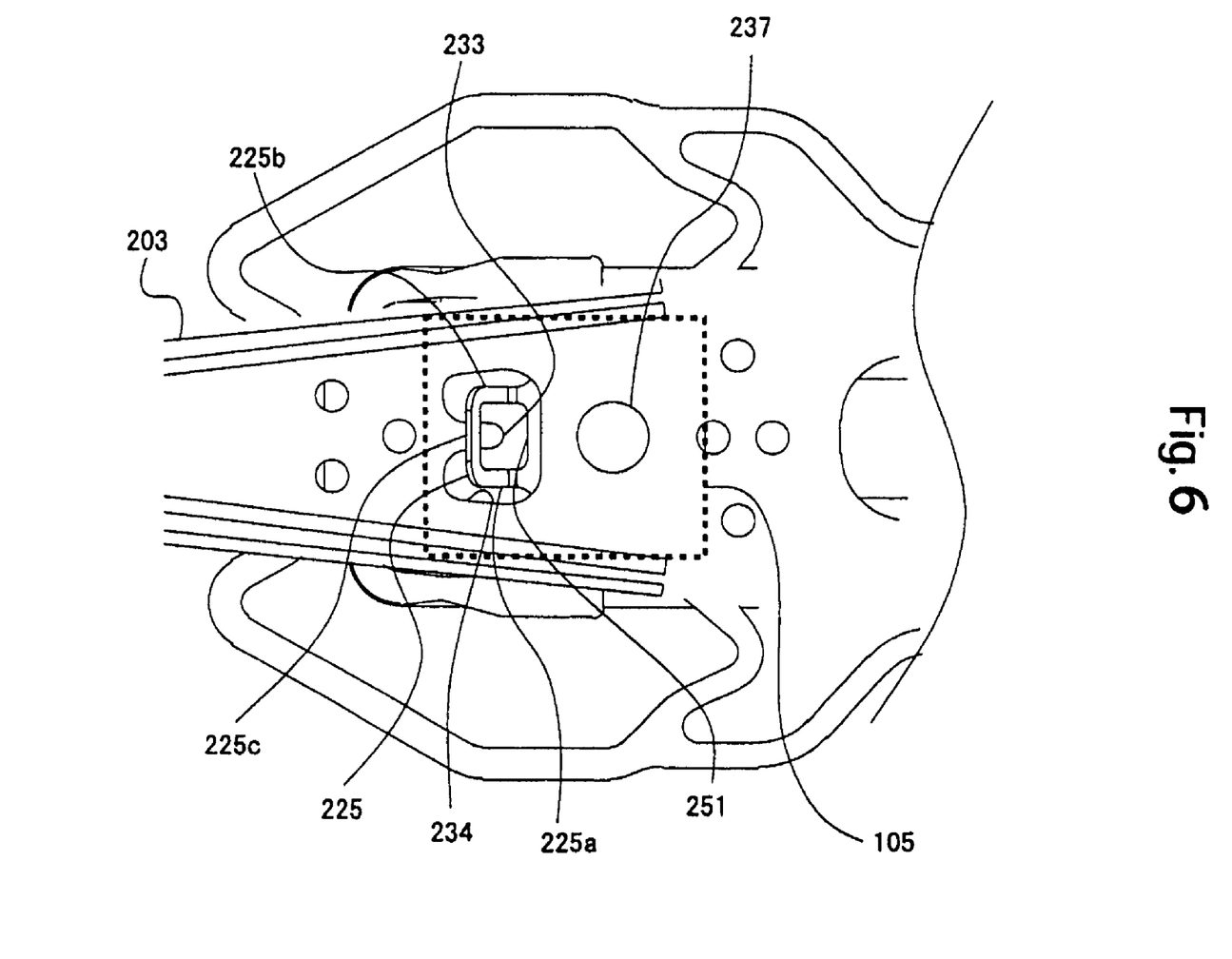
FIG. 6 is a schematic plan view showing the structure of the limiter mechanism according to one embodiment of the present invention.

The limiter tab 225 has the opening 251 as shown in FIG. 6. The projection 233 of the load beam 203 penetrates the opening 251 of the limiter tab 225, as shown in FIG. 5(b). The limiter tab 225 has the limiter tab arms 225a and 225b, which extend from the front end of the gimbal tongue 224. In addition, the limiter tab 225 has the locking means 225c which engages with the projection 233 at the time of deformation and which also joins the limiter tab arms 225a and 225b. The limiter tab arms 225a and 225b penetrate the opening 234 of the load beam 203 from its side facing the head slider 105 to its opposite side facing the back of the load beam.

The limiter tab 225 is fabricated such that the locking means 225c faces the projection 233 in the back side of the load beam. The locking means 225c should be separate from the projection 233 as shown in FIG. 5(b), so that there is no possibility of dust occurring from contact between the locking means 225c and the projection 233. The opening 251 of the limiter tab 225 is defined by the limiter tab arms 225a and 225b, the locking means 225c, and the front end of the gimbal tongue 224. The fact that the limiter tab 225 has the opening 251 contributes to the weight reduction of the limiter tab 225a nd the good dynamics of the head slider 105.

The limiter mechanism limits the gap between the gimbal 202 (or the head slider 105) and the load beam 203, thereby assisting the upward movement of the head slider 105 (at the time of unloading) or protecting the gimbal 202 from deformation due to external impact. In other words, when the head slider 105 moves toward the magnetic disk due to external impact, the gimbal 202 deforms so that the limiter tab 225 engages with the projection 233 of the load beam 203.

To be concrete, although the limiter tab 225 is separate from the projection 233 in the normal state, it moves toward the magnetic disk due to impact and the projection 223 comes into contact with the end of the opening 251 of the limiter tab 225. In other words, the projection 223 engages with the locking means 225c of the limiter tab 225, thereby preventing the gimbal 202 from deforming more than the limit. This mechanism prevents the head slider 105 from greatly displacing away from the load beam 203 when it experiences a large external impact. Thus, a high impact resistance is achieved.

Incidentally, the opening 234 of the load beam 203 may be provided with a projection that engages with the limiter tab 225a t its rear end (opposite to the tab 116). In this case, the limiter tab 225 is bent toward the gimbal tongue 224. The projection engages with the limiter tab 225, thereby protecting the gimbal 202 from deformation. However, the illustrated limiter structure is desirable from the standpoint of easy production.

Figure 7A:
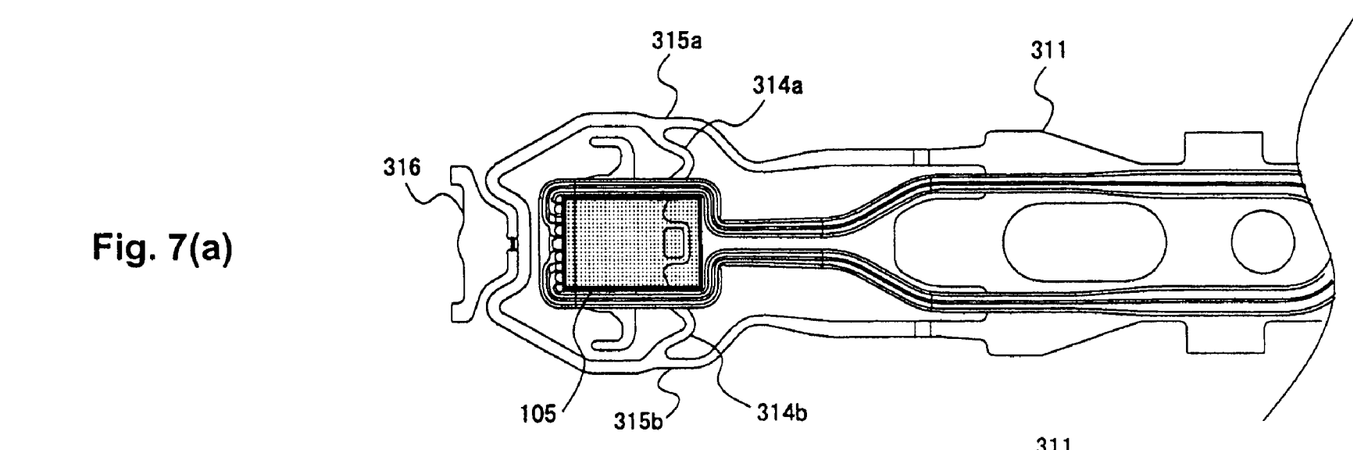
FIGS. 7(a)-(b) are diagrams showing the structure of the limiter mechanism according to another preferred embodiment of the present invention.
Figure 7B:
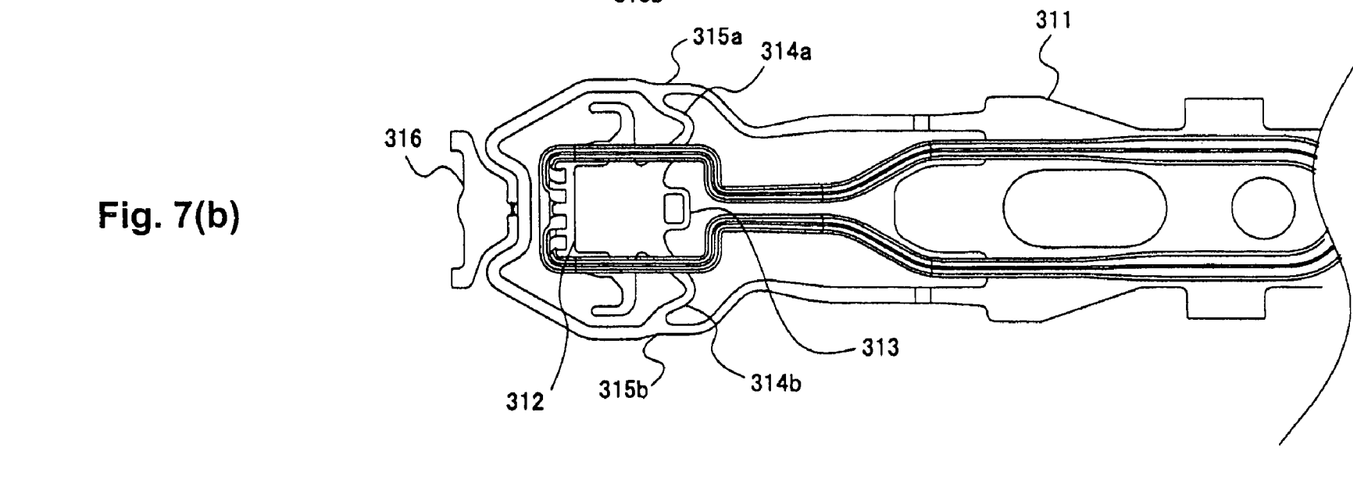

FIGS. 7(a)-(b) are schematic plan views showing the limiter tab according to another embodiment, with the head slider 105 fixed to the gimbal 311 (FIG. 7(a)) and the head slider 105 removed (FIG. 7(b)). The gimbal 311 has the limiter tab 313 at the rear end of the gimbal tongue 312. In other words, the limiter tab 313 extends backward from the rear side of the gimbal tongue 312.

The limiter tab 313 is within the silhouette of the head slider 105 as in the case of the embodiment shown in FIG. 4. Also, the limiter tab 313 is formed by etching and bending from part of the head gimbal 311 within the silhouette of the head slider 105.

According to this embodiment, the gimbal tongue 312 is joined at its rear side to the gimbal arms 315a and 315b by the link arms 314a and 314b extending in the direction of rotary movement. This structure may be acceptable for the design of the HGA. In this structure, the pad comes into contact with the gimbal tongue at the front side of the head slider 105.

The limiter tab 313 placed at the rear of the gimbal tongue 312 protects the gimbal 311 from large deformation when the head slider 105 retreats to the ramp. It also effectively prevents the head slider 105 from undesirable movements by external impact in concert with the gimbal tab 316 formed at the front of the head slider 105.

The present invention has been described above with reference to its preferred embodiments; however, its scope is not limited to them. It may be changed and modified variously by those who are skilled in the art. For example, it may be applied to disk drive units with recoding disks different from HDD used in the present invention. Moreover, the present invention may be modified such that the gimbal and the load beam are combined into a suspension instead of being formed separately. Also, the present invention may be applied to the HGA having only read elements.

The above-mentioned limiter mechanism, in which the projection of the load beam engages with the end of the opening of the limiter tab, may be so modified as to have a T-shaped limiter tab which penetrates the opening of the load beam and its T-shaped head appears on the back of the load beam. In this configuration, the T-shaped head engages with the back of the load beam.

What is claimed is:

1. An assembly having a slider and a suspension supporting said slider, wherein said suspension has a gimbal and a load beam, said gimbal having a tongue to which said slider is fixed and a limiter tab which limits a displacement of said tongue and said load beam having a locking part which supports said gimbal on a first surface of said locking part and locks said limiter tab, said limiter tab and said locking part being within a region overlapping said slider in a direction perpendicular to said first surface, and said limiter tab is formed by fabricating part of said gimbal within said region overlapping said slider in a direction perpendicular to said first surface, wherein said limiter tab extends from a front end or a rear end of said tongue and passes through a hole of said load beam, wherein said locking part engages with said limiter tab at an opposite side of said first surface, and wherein the limiter tab and said hole are positioned within the silhouette of the slider.

2. The assembly as defined in claim 1, wherein said load beam has a pad that comes into contact with said tongue at a front of said slider, said tongue connects with a main body of said gimbal at a front of a center of said tongue, and said limiter tab extends from a rear of said tongue.

3. The assembly as defined in claim 1, wherein said limiter tab has a lengthwise dimension (projected onto said first surface) which is smaller than one half of a lengthwise dimension (projected onto said first surface) of said slider.

4. The assembly as defined in claim 1, wherein said load beam has a pad that comes into contact with said tongue at a rear of said slider, and said limiter tab extends from a front of said tongue.

5. The assembly as defined in claim 1, wherein said tongue connects with a main body of said gimbal at a rear side of a center of said tongue.

6. The assembly as defined in claim 1, wherein said load beam has a pad that comes into contact with said tongue at the rear of said slider, said tongue connects with a main body of said gimbal at a rear of a center of said tongue, and said limiter tab extends from a front of said tongue.

7. The assembly as defined in claim 1, wherein said load beam has a pad that comes into contact with said tongue at a front of said slider, and said limiter tab extends from a rear of said tongue.

8. The assembly as defined in claim 1, wherein said tongue connects with a main body of said gimbal at a front of a center of said tongue, and said limiter tab extends from a rear of said tongue.

9. An assembly having a slider and a suspension supporting said slider, wherein said suspension has a gimbal and a load beam, said gimbal having a tongue to which said slider is fixed and a limiter tab which limits a displacement of said tongue and said load beam having a locking part which supports said gimbal on a first surface of said locking part and locks said limiter tab, said limiter tab and said locking part being within a region overlapping said slider in a direction perpendicular to said first surface, and said limiter tab is formed by fabricating part of said gimbal within said region overlapping said slider in a direction perpendicular to said first surface, wherein said limiter tab extends from a front end or a rear end of said tongue and passes through a hole of said load beam, wherein said locking part engages with said limiter tab at an opposite side of said first surface, wherein the perimeter of the hole is comprised entirely within the load beam, wherein said limiter tab has a lengthwise dimension (projected onto said first surface) which is smaller than one half of a lengthwise dimension (projected onto said first surface) of said slider, and wherein the limiter tab and said hole are positioned within the silhouette of the slider.

10. A disk drive unit, comprising:
a motor that rotates a disk;
a slider that floats above said disk;
a suspension that supports said slider; and
an actuator that turns around a rotational axis to move said slider,
wherein said suspension has a gimbal and a load beam, said gimbal having a tongue to which said slider is fixed and a limiter tab which limits the displacement of said tongue and said load beam having a locking part which supports said gimbal on a surface facing said disk and locks said limiter tab, said limiter tab and said locking part being within a region overlapping said slider in a direction perpendicular to a recording surface of said disk, and said limiter tab is formed by fabricating part of said gimbal within said region overlapping said slider in said direction perpendicular to said recording surface of said disk, wherein said limiter tab passes through a hole of said load beam, wherein said locking part engages with said limiter tab, and wherein the limiter tab and said hole are positioned within the silhouette of the slider.

11. The disk drive unit as defined in claim 10, wherein said limiter tab extends from a front end or a rear end of said tongue.

* * * * *